US012146367B2

(12) United States Patent
Ding et al.

(10) Patent No.: US 12,146,367 B2
(45) Date of Patent: Nov. 19, 2024

(54) ELECTRIC LIFTING CURTAIN

(71) Applicant: AWNLUX (SHANGHAI) SUNSHADE TECHNOLOGY CO., LTD, Shanghai (CN)

(72) Inventors: Linfeng Ding, Shanghai (CN); Jincheng Bian, Shanghai (CN); Kuo Li, Shanghai (CN)

( * ) Notice: Subject to any disclaimer, the term of this patent is extended or adjusted under 35 U.S.C. 154(b) by 332 days.

(21) Appl. No.: 17/457,671

(22) Filed: Dec. 6, 2021

(65) Prior Publication Data

US 2022/0090447 A1 Mar. 24, 2022

(30) Foreign Application Priority Data

Dec. 7, 2020 (CN) ........................ 202011430514.2

(51) Int. Cl.
*E06B 9/72* (2006.01)
*E06B 9/50* (2006.01)
*E06B 9/54* (2006.01)

(52) U.S. Cl.
CPC .................. *E06B 9/72* (2013.01); *E06B 9/50* (2013.01); *E06B 9/54* (2013.01)

(58) Field of Classification Search
CPC ..... E06B 9/72; E06B 9/50; E06B 9/54; E06B 2009/2423; E06B 2009/2447; E06B 2009/247; E06B 9/74; E06B 2009/2405
USPC .......................................................... 160/310
See application file for complete search history.

(56) References Cited

U.S. PATENT DOCUMENTS

| | | | | |
|---|---|---|---|---|
| 9,314,125 | B2 * | 4/2016 | Anthony | E06B 9/322 |
| 11,486,196 | B2 * | 11/2022 | Huang | E06B 9/62 |
| 2011/0027055 | A1 | 2/2011 | Nunley | |
| 2013/0340949 | A1 * | 12/2013 | Anderson | E06B 9/262 160/84.02 |
| 2017/0113518 | A1 | 4/2017 | Park | |
| 2018/0347267 | A1 * | 12/2018 | Dekker | E06B 9/307 |
| 2019/0218080 | A1 | 7/2019 | Chan | |

* cited by examiner

*Primary Examiner* — Beth A Stephan
(74) *Attorney, Agent, or Firm* — Zhigang Ma

(57) ABSTRACT

The present invention provides an electric lifting curtain, which comprises a cover shell, a shade cloth and an anti-mosquito curtain, wherein first driving components are provided at both ends inside the upper end of the cover shell, the first driving components comprise a first biaxial motor, a first side cover and a first fixed cover plate, first output shafts are provided at both ends of the first biaxial motor, one end of the first output shaft is fixedly sleeved with a first transmission shaft, one end of the first transmission shaft is integrally connected with a first driving wheel, the outer side of the first transmission shaft is sleeved with a first driven wheel, and second driving components are provided at both ends inside the lower end of the cover shell.

8 Claims, 5 Drawing Sheets

ELECTRIC LIFTING CURTAIN

TECHNICAL FIELD

The present invention relates to the technical field of curtains, in particular to electric lifting curtains.

BACKGROUND

Curtains are made of cloth, linen, yarn, aluminum sheets, wood chips, metal materials, etc., and have the functions of shading, heat insulation, and adjusting indoor light. Cloth curtains are made of cotton gauze, polyester cloth, polyester-cotton blended fabric, cotton-linen blended fabric, non-woven fabric, etc. Different materials, textures, colors, patterns, etc. are combined to form different styles of cloth curtains, which are matched with different styles of indoor design curtains.

Most of the existing curtains are operated manually and operated electrically by a single motor. Manual operation enables the simplest rail to move up and down by manpower to open and close the curtains, which is laborious and inconvenient to use. Single motor operation uses one motor, but the function is relatively simple. In order to solve the above problems, an electric lifting curtain is put forward.

SUMMARY

The purpose of the present invention is to provide an electric lifting curtain, which can realize the synchronous operation of the shade cloth and the anti-mosquito curtain, and can also make the shade cloth or the anti-mosquito curtain operate independently, so that the curtain can be operated in various ways such as fully open shading, fully open anti-mosquito, fully closing and half-opening, and can also be stopped at any position. The electric lifting curtain has various functions, manual and electric integration and convenient operation.

The embodiment of the present invention is realized as follows.

The embodiment of the present invention provides an electric lifting curtain, consisted of a cover shell, a shade cloth and an anti-mosquito curtain, wherein first driving components are provided at both ends inside the upper end of the cover shell, the first driving components comprise a first biaxial motor, a first side cover and a first fixed cover plate, first output shafts are provided at both ends of the first biaxial motor, one end of the first output shaft is fixedly sleeved with a first transmission shaft, one end of the first transmission shaft is integrally connected with a first driving wheel, the outer side of the first transmission shaft is sleeved with a first driven wheel, second driving components corresponding to the first driving components are provided at both ends inside the lower end of the cover shell, the second driving component comprises a second biaxial motor, a second side cover and a second fixed cover plate, both ends of the second biaxial motor are provided with a second output shaft, a second transmission shaft is fixedly sleeved outside one end of the second output shaft, one end of the second transmission shaft is integrally connected with a second driving wheel, the outer side of the second transmission shaft is sleeved with a second driven wheel, the second driven wheel is located directly under the first driving wheel, a first gear belt is provided between the second driven wheel and the first driving wheel, the second driving wheel is located directly under the first driven wheel, a second gear belt is provided between the second driving wheel and the first driven wheel, two rope winders are symmetrically provided outside the first output shaft in the upper end of the cover shell, and a first pull rod and a second pull rod are provided inside the cover shell.

Preferably, the first fixed cover plate is fixed at one end of the first side cover by screws, a first bearing is provided outside the first transmission shaft inside the first fixed cover plate, the first transmission shaft is rotatably connected inside the first fixed cover plate through the first bearing, one end of the first transmission shaft inside the first side cover is provided with a first shaft sleeve, the first shaft sleeve is fixed inside the first side cover, the first transmission shaft is rotatably connected with the first shaft sleeve, and the first side cover is detachably connected to the corner of the upper end of the cover shell.

Preferably, the first driven wheel is rotatably connected with the first transmission shaft, the first driving wheel is located at one side of the first driven wheel, and a first clapboard is provided between the first driving wheel and the first driven wheel outside the first transmission shaft.

Preferably, the second fixed cover plate is fixed at one end of the second side cover by screws, a second bearing is provided outside the second transmission shaft inside the second fixed cover plate, the second transmission shaft is rotatably connected inside the second fixed cover plate through the second bearing, one end of the second transmission shaft in the second side cover is provided with a second shaft sleeve, the second shaft sleeve is fixed in the second side cover, the second transmission shaft is rotatably connected with the second shaft sleeve, and the second side cover is detachably connected to the corner of the lower end of the cover shell.

Preferably, the second driven wheel is rotatably connected with the second transmission shaft, the second driven wheel is located at one side of the second driving wheel, and a second clapboard is provided between the second driven wheel and the second driving wheel outside the second transmission shaft.

Preferably, the first driving wheel drives the second driven wheel to rotate through the first gear belt, and the second driving wheel drives the first driven wheel to rotate through the second gear belt.

Preferably, the inner surface of the first gear belt is fixedly connected with a first toothed belt lock, both ends of the first pull rod are inserted into the first toothed belt lock, the inner surface of the second gear belt is fixedly connected with a second toothed belt lock, both ends of the second pull rod are inserted into the second toothed belt lock, and the first pull rod and the second pull rod are slidably connected to the inner side of the cover shell through the first gear belt and the second gear belt respectively.

Preferably, the lower end of the shade cloth is wound around the surface of the first pull rod, the rope winder is fixed outside the first output shaft, the upper end of the anti-mosquito curtain is wound around the surface of the second pull rod, and the shade cloth is located in front of the anti-mosquito curtain.

The embodiment of the present invention has the following beneficial effects. The embodiment of the present invention provides an electric lifting curtain, wherein the first transmission shaft is sleeved outside the first output shaft. The first transmission shaft welds the first driving wheel outside the first transmission shaft through the first bearing, the first driving wheel, the first shaft sleeve and the first driven wheel. One end of the first transmission shaft is fixed inside the first side cover through the first shaft sleeve. The first bearing is installed inside the first fixed cover plate. The first fixed cover plate is fixed at one end of the first side cover by screws. The second transmission shaft is sleeved outside the second output shaft. The second transmission shaft welds the second driving wheel outside the second transmission shaft through the second bearing, the second driven wheel, the second shaft sleeve and the second driving wheel. One end of the second transmission shaft is fixed inside the second side cover through the second shaft sleeve. The second bearing is installed inside the second fixed cover plate. The second fixed cover plate is fixed at one end of the second side cover by screws. The first gear belt is sleeved between the first driving wheel and the second driving wheel. The second gear belt is sleeved between the first driven wheel and the second driven wheel. The first side cover and the second side cover are fixed at the corners of the cover shell. The first pull rod is fixed between the two first gear belts by the first toothed belt lock, and the second pull rod is fixed between the two second gear belts by the second toothed belt lock. The first output shaft and the first transmission shaft are driven to rotate by the first biaxial motor, so that the first driving wheel rotates. The second driven wheel and the first gear belt can be driven to rotate by the first driving wheel. During the rotation of the first gear belt, the first toothed belt lock and the first pull rod can be driven to move up and down. At the same time, the first output shaft can drive the rope winder to retract and extend during the rotation, so that the shade cloth can be retracted and extended. Similarly, the second output shaft and the second transmission shaft are driven to rotate by the second biaxial motor, so that the second driving wheel rotates. The first driven wheel and the second gear belt can be driven to rotate by the second driving wheel. During the rotation of the second gear belt, the second toothed belt lock and the second pull rod can be driven to move up and down, so that the mosquito curtain can be retracted and extended. The electric lifting curtain can realize the synchronous operation of the shade cloth and the anti-mosquito curtain, and can also make the shade cloth or the anti-mosquito curtain operate independently, so that the curtain can be operated in various ways such as fully open shading, fully open anti-mosquito, fully closing and half-opening, and can also be stopped at any position. The electric lifting curtain has manual and electric integration, various functions and convenient operation. The use effect is better than that of traditional methods.

BRIEF DESCRIPTION OF THE DRAWINGS

In order to explain the technical scheme of the embodiments of the present invention more clearly, the drawings required in the embodiments will be briefly introduced. It should be understood that the following drawings only show some embodiments of the present invention, so that they should not be regarded as protected limits. For those related embodiments from ordinary technicians in this field without creative efforts, they should be protected within present invention patent.

Figure 1:
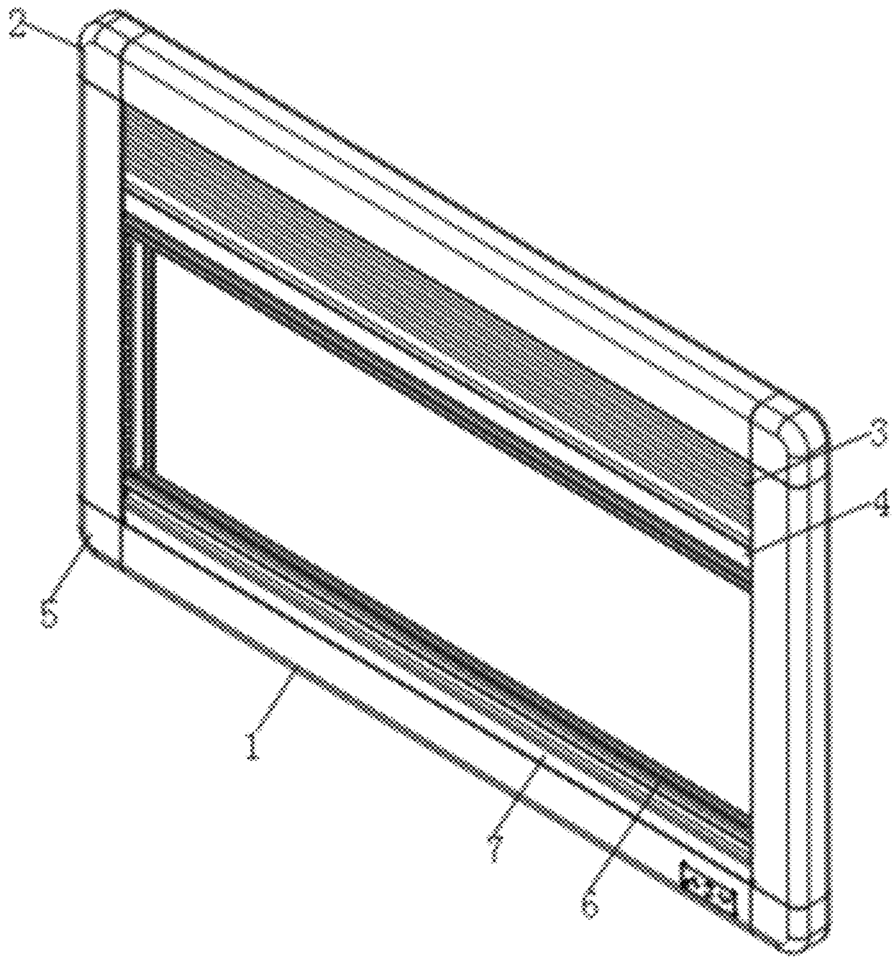
FIG. 1 is a schematic diagram of the overall structure of an electric lifting curtain according to the present invention.

Reference numerals in the figures: 1. Cover shell; 2. First driving component; 21. First biaxial motor; 22. First output shaft; 23. First side cover; 24. First transmission shaft; 25. First fixed cover plate; 26. First bearing; 27. First driving wheel; 28. First shaft sleeve; 29. First driven wheel; 210. First clapboard; 3. Shade cloth; 4. First pull rod; 5. Second driving component; 51. Second biaxial motor; 52. Second output shaft; 53. Second side cover; 54. Second transmission shaft; 55. Second fixed cover plate; 56. Second bearing; 57. Second driven wheel; 58. Second shaft sleeve; 59. Second driving wheel; 510. Second clapboard; 6. Anti-mosquito curtain; 7. Second pull rod; 8. Rope winder; 10. First gear belt; 11. Second gear belt; 12. First toothed belt lock; 13. Second toothed belt lock.

DETAILED DESCRIPTION OF THE EMBODIMENTS

In order to make the purpose, technical scheme and advantages of the embodiments of the present invention clearer, the technical scheme in the embodiments of the present invention will be clearly and completely described hereinafter with reference to the drawings in the embodiments of the present invention. Therefore, the following detailed description of the embodiments of the present invention provided in the drawings is not intended to limit the claimed scope of the present invention, but only to represent selected embodiments of the present invention. Based on the embodiments in the present invention, all other embodiments obtained by those skilled in the art without creative efforts fall within the scope of the present invention.

In the description of the present invention, it should be noted that the orientation or positional relationship indicated by the terms "center", "upper", "lower", "vertical", "horizontal", "inner" and "outer" is based on the orientation or positional relationship shown in the drawings, or the orientation or positional relationship that the product of the present invention is usually placed when in use. The orientation or positional relationship is only for the convenience of describing the present invention and simplifying the description, rather than indicating or implying that the indicated device or element must have a specific orientation, be constructed and operated in a specific orientation, and therefore cannot be understood as a limitation of the present invention. In addition, the terms "first", "second" and "third" are only used to distinguish descriptions, and cannot be understood as indicating or implying relative importance.

In addition, the terms "horizontal" and "vertical" do not mean that the components are required to be absolutely horizontal or vertical, but can be slightly inclined. For example, "horizontal" only means that its direction is more horizontal than "vertical", which does not mean that the structure must be completely horizontal, but can be slightly inclined.

In the description of the present invention, it should be noted that the terms "providing", "installing", "connecting" and "linking" should be broadly understood. For example, they may be fixed connection, detachable connection or integrated connection; or may be direct connection, indirect connection through an intermediate medium, and may be internal communication of two elements. For those skilled in the art, the specific meanings of the above terms in the present invention can be understood in specific situations.

Figure 2:
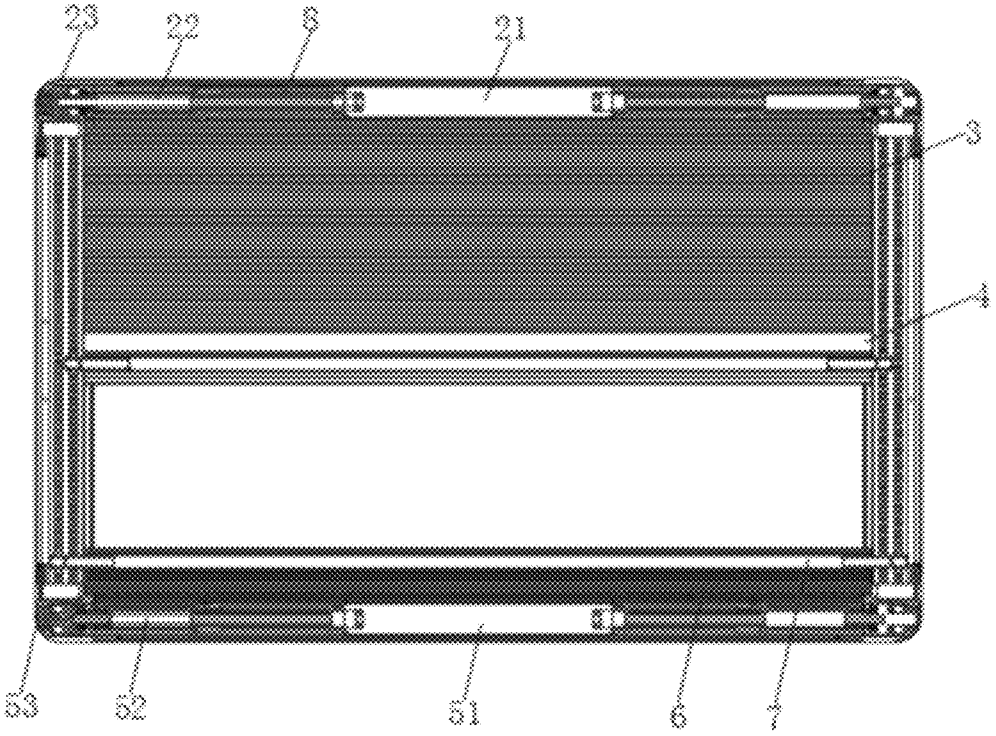
FIG. 2 is a schematic view of the cross-section structure of an electric lifting curtain according to the present invention.
Figure 3:
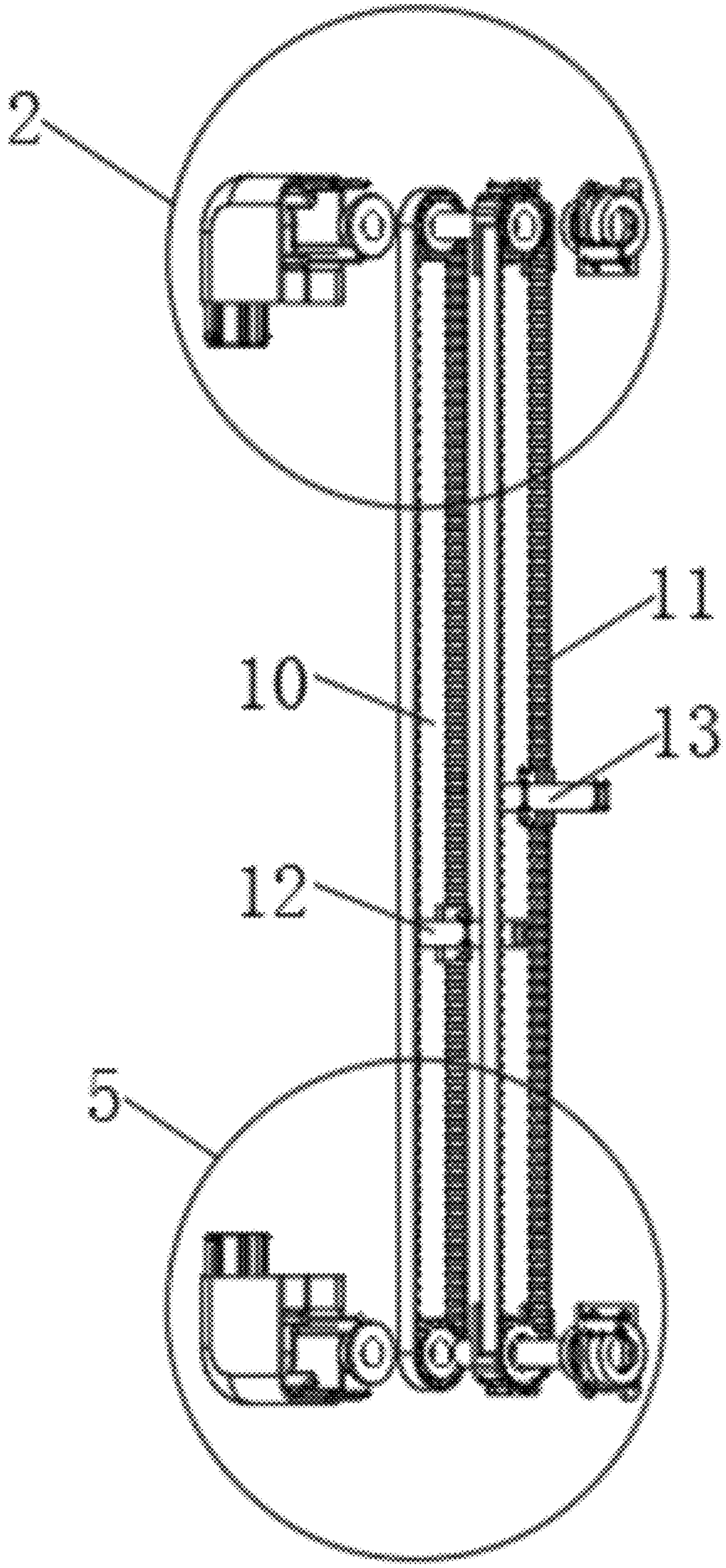
FIG. 3 is a partial structural schematic diagram of an electric lifting curtain according to the present invention.
Figure 4:
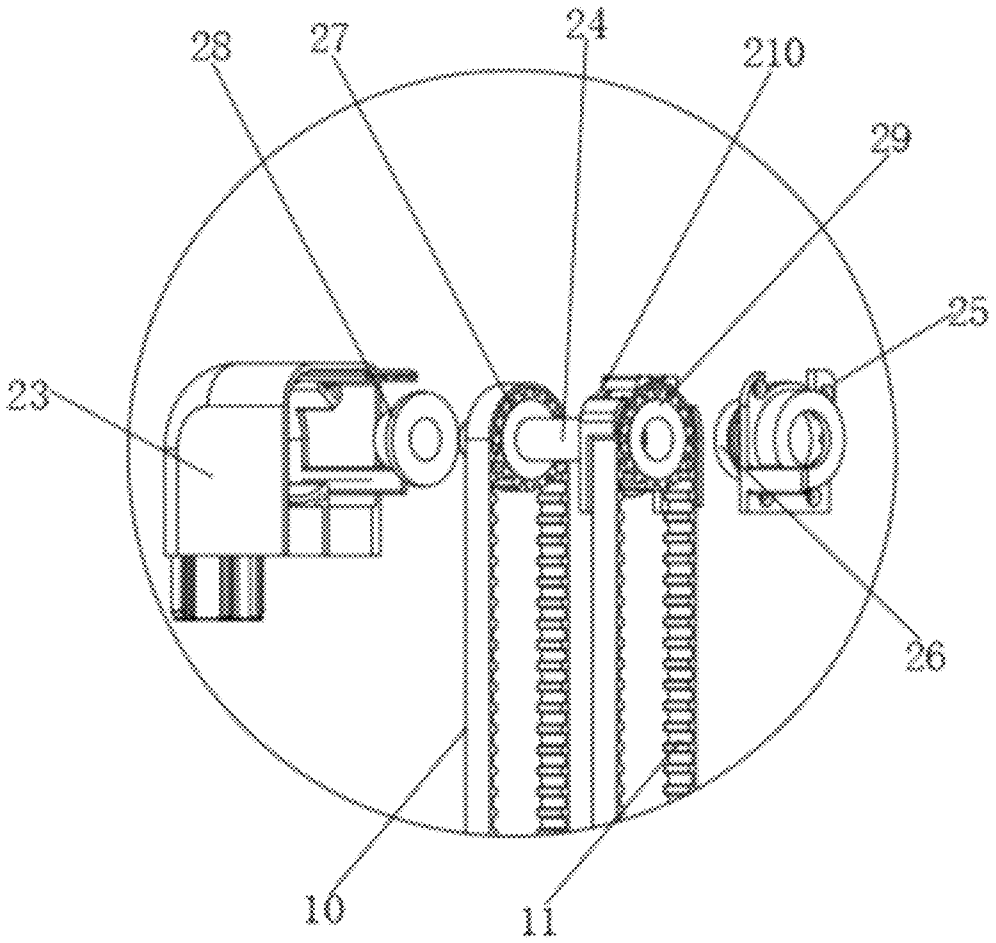
FIG. 4 is an enlarged schematic diagram of the structure of a first driving component of an electric lifting curtain according to the present invention.
Figure 5:
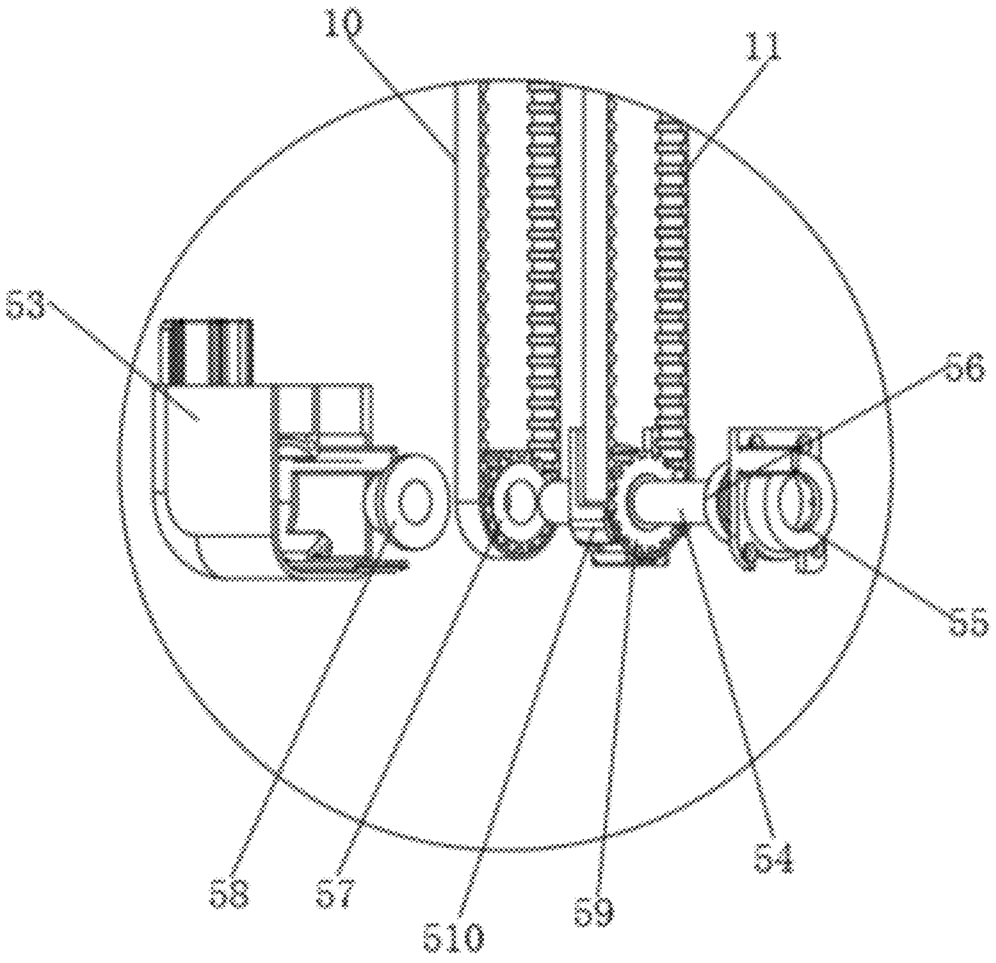
FIG. 5 is an enlarged schematic diagram of the structure of a second driving component of an electric lifting curtain according to the present invention.

As shown in FIGS. 1-5, the electric lifting curtain provided by the embodiment of the present invention comprises a cover shell 1, a shade cloth 3 and an anti-mosquito curtain 6, wherein first driving components 2 are provided at both ends inside the upper end of the cover shell 1, the first driving components 2 comprise a first biaxial motor 21, a first side cover 23 and a first fixed cover plate 25, first output shafts 22 are provided at both ends of the first biaxial motor 21, one end of the first output shaft 22 is fixedly sleeved with a first transmission shaft 24, one end of the first transmission shaft 24 is integrally connected with a first driving wheel 27, the outer side of the first transmission shaft 24 is sleeved with a first driven wheel 29, second driving components 5 corresponding to the first driving components 2 are provided at both ends inside the lower end of the cover shell 1, the second driving component 5 comprises a second biaxial motor 51, a second side cover 53 and a second fixed cover plate 55, both ends of the second biaxial motor 51 are provided with a second output shaft 52, a second transmission shaft 54 is fixedly sleeved outside one end of the second output shaft 52, one end of the second transmission shaft 54 is integrally connected with a second driving wheel 59, the outer side of the second transmission shaft 54 is sleeved with a second driven wheel 57, the second driven wheel 57 is located directly under the first driving wheel 27, a first gear belt 10 is provided between the second driven wheel 57 and the first driving wheel 27, the second driving wheel 59 is located directly under the first driven wheel 29, a second gear belt 11 is provided between the second driving wheel 59 and the first driven wheel 29, two rope winders 8 are symmetrically provided outside the first output shaft 22 in the upper end of the cover shell 1, and a first pull rod 4 and a second pull rod 7 are provided inside the cover shell 1.

In this embodiment, the first fixed cover plate 25 is fixed at one end of the first side cover 23 by screws, a first bearing 26 is provided outside the first transmission shaft 24 inside the first fixed cover plate 25, the first transmission shaft 24 is rotatably connected inside the first fixed cover plate 25 through the first bearing 26, one end of the first transmission shaft 24 inside the first side cover 23 is provided with a first shaft sleeve 28, the first shaft sleeve 28 is fixed inside the first side cover 23, the first transmission shaft 24 is rotatably connected with the first shaft sleeve 28, and the first side cover 23 is detachably connected to the corner of the upper end of the cover shell 1.

The first driven wheel 29 is rotatably connected with the first transmission shaft 24, the first driving wheel 27 is located at one side of the first driven wheel 29, and a first clapboard 210 is provided between the first driving wheel 27 and the first driven wheel 29 outside the first transmission shaft 24.

Specifically, the first output shaft 22 and the first transmission shaft 24 are driven to rotate by the first biaxial motor 21, so that the first driving wheel 27 rotates. The second driven wheel 57 and the first gear belt 10 are driven to rotate by the first driving wheel 27. The first driving wheel 27 and the first driven wheel 29 are prevented from interfering with each other by the first clapboard plate 210. The resistance of the first transmission shaft 24 when rotating can be reduced by the first bearing 26 and the first shaft sleeve 28, so that the first transmission shaft 24 rotates more smoothly.

In this embodiment, the second fixed cover plate 55 is fixed at one end of the second side cover 53 by screws, a second bearing 56 is provided outside the second transmission shaft 54 inside the second fixed cover plate 55, the second transmission shaft 54 is rotatably connected inside the second fixed cover plate 55 through the second bearing 56, one end of the second transmission shaft 54 in the second side cover 53 is provided with a second shaft sleeve 58, the second shaft sleeve 58 is fixed in the second side cover 53, the second transmission shaft 54 is rotatably connected with the second shaft sleeve 58, and the second side cover 53 is detachably connected to the corner of the lower end of the cover shell 1.

The second driven wheel 57 is rotatably connected with the second transmission shaft 54, the second driven wheel 57 is located at one side of the second driving wheel 59, and a second clapboard 510 is provided between the second driven wheel 57 and the second driving wheel 59 outside the second transmission shaft 54.

Specifically, the second output shaft 52 and the second transmission shaft 54 are driven to rotate by the second biaxial motor 51, so that the second driving wheel 59 rotates. The first driven wheel 29 and the second gear belt 11 can be driven to rotate by the second driving wheel 59. The second driven wheel 57 and the second driving wheel 59 can be prevented from interfering with each other by the second clapboard plate 510. The second transmission shaft 54 can rotate more smoothly by the second bearing 56 and the second shaft sleeve 58.

In this embodiment, the first driving wheel 27 drives the second driven wheel 57 to rotate through the first gear belt 10, and the second driving wheel 59 drives the first driven wheel 29 to rotate through the second gear belt 11.

The inner surface of the first gear belt 10 is fixedly connected with a first toothed belt lock 12, both ends of the first pull rod 4 are inserted into the first toothed belt lock 12, the inner surface of the second gear belt 11 is fixedly connected with a second toothed belt lock 13, both ends of the second pull rod 7 are inserted into the second toothed belt lock 13, and the first pull rod 4 and the second pull rod 7 are slidably connected to the inner side of the cover shell 1 through the first gear belt 10 and the second gear belt 11 respectively.

The lower end of the shade cloth 3 is wound around the surface of the first pull rod 4, the rope winder 8 is fixed outside the first output shaft 22, the upper end of the anti-mosquito curtain 6 is wound around the surface of the second pull rod 7, and the shade cloth 3 is located in front of the anti-mosquito curtain 6.

Specifically, during the rotation of the first gear belt 10, the first toothed belt lock 12 and the first pull rod 4 can be driven to move up and down. At the same time, the first output shaft 22 can drive the rope winder 8 to retract and extend during the rotation, so that the shade cloth 3 can be retracted and extended. Moreover, during the rotation of the second gear belt 11, the second toothed belt lock 13 and the second pull rod 7 can be driven to move up and down, so that the mosquito curtain 6 can be retracted and extended, and the synchronous operation of the shade cloth 3 and the mosquito curtain 6 can be realized.

It should be noted that the present invention is an electric lifting curtain, in which the user sleeves the first transmission shaft 24 outside the first output shaft 22. The first transmission shaft 24 passes through the first bearing 26, the first driving wheel 27, the first shaft sleeve 28 and the first driven wheel 29. The first driving wheel 27 is welded outside the first transmission shaft 24. One end of the first transmission shaft 24 is fixed inside the first side cover 23 through the first shaft sleeve 28. The first bearing 26 is installed inside the first fixed cover plate 25. The first fixed cover plate 25 is fixed at one end of the first side cover 23 by screws. The second transmission shaft 54 is sleeved outside the second output shaft 52. The second transmission shaft 54 welds the second driving wheel 59 outside the second transmission shaft 54 through the second bearing 56, the second driven wheel 57, the second shaft sleeve 58 and the second driving wheel 59. One end of the second transmission shaft 54 is fixed inside the second side cover 53 through the second shaft sleeve 58. The second bearing 56 is installed inside the second fixed cover plate 55. The second fixed cover plate 55 is fixed at one end of the second side cover 53 by screws. The first gear belt 10 is sleeved between the first driving wheel 27 and the second driven wheel 57. The second gear belt 11 is sleeved between the first driven wheel 29 and the second driven wheel 59. The first side cover 23 and the second side cover 53 are fixed at the corners of the cover shell 1. The first pull rod 4 is fixed between the two first gear belts 10 by the first toothed belt lock 12, and the second pull rod 7 is fixed between the two second gear belts 11 by the second toothed belt lock 13. The first output shaft 22 and the first transmission shaft 24 are driven to rotate by the first biaxial motor 21, so that the first driving wheel 27 rotates. The second driven wheel 57 and the first gear belt 10 can be driven to rotate by the first driving wheel 27. During the rotation of the first gear belt 10, the first toothed belt lock 12 and the first pull rod 4 can be driven to move up and down. At the same time, the first output shaft 22 can drive the rope winder 8 to retract and extend during the rotation, so that the shade cloth 3 can be retracted and extended. Similarly, the second output shaft 52 and the second transmission shaft 54 are driven to rotate by the second biaxial motor 51, so that the second driving wheel 59 rotates. The first driven wheel 29 and the second gear belt 11 can be driven to rotate by the second driving wheel 59. During the rotation of the second gear belt 11, the second toothed belt lock 13 and the second pull rod 7 can be driven to move up and down, so that the mosquito curtain 6 can be retracted and extended. The electric lifting curtain can realize the synchronous operation of the shade cloth 3 and the anti-mosquito curtain 6, and can also make the shade cloth 3 or the anti-mosquito curtain 6 operate independently.

The above is only the preferred embodiment of the present invention, rather than limit the present invention. For those ordinary technicians in this field, the present invention may have various modifications and changes. Any modification, equivalent replacement, improvement, etc. made within the spirit and principle of the present invention should be included in the scope of protection of the present invention.

What is claimed is:

1. An electric lifting curtain, consisting of a cover shell (1), a shade cloth (3) and an anti-mosquito curtain (6), wherein a first driving component (2) is provided inside an upper end of the cover shell (1), the first driving component comprises a first biaxial motor (21), two first side covers (23) and two first fixed cover plates (25), two first output shafts (22) are provided at two opposite ends of the first biaxial motor (21) respectively, one end of each of the first output shafts (22) is fixedly sleeved with a first transmission shaft (24), a first end of the first transmission shaft (24) is integrally connected with a first driving wheel (27), an outer side of the first transmission shaft (24) is sleeved with a first driven wheel (29), a second driving component (5) is provided inside a lower end of the cover shell (1), the second driving component (5) comprises a second biaxial motor (51), two second side covers (53) and two second fixed cover plates (55), each of two opposite ends of the second biaxial motor (51) are provided with a second output shaft (52), a second transmission shaft (54) is fixedly sleeved outside one end of each of the second output shafts (52), a first end of the second transmission shaft (54) is integrally connected with a second driving wheel (59), an outer side of the second transmission shaft (54) is sleeved with a second driven wheel (57), the second driven wheels (57) are located directly under the first driving wheels (27), first gear belts (10) are connected between the second driven wheels (57) and the first driving wheels (27), the second driving wheels (59) are located directly under the first driven wheels (29), second gear belts (11) are connected between the second driving wheels (59) and the first driven wheels (29), two rope winders (8) are symmetrically provided outside the two first output shafts (22) respectively in the upper end of the cover shell (1), and a first pull rod (4) and a second pull rod (7) are provided inside the cover shell (1).

2. The electric lifting window curtain according to claim 1, wherein each of the first fixed cover plates (25) is fixed at one end of one of the first side covers (23) by screws, a first bearing (26) is provided outside each of the first transmission shafts (24) inside the first fixed cover plates (25), the first transmission shaft (24) is rotatably connected inside the first fixed cover plate (25) through the first bearing (26), the first end of the first transmission shaft (24) extends inside the first side cover (23), a first shaft sleeve (28) is fixed inside the first side cover (23), the first end of the first transmission shaft (24) is rotatably connected with the first shaft sleeve (28), and the first side cover (23) is detachably connected to a corner of the upper end of the cover shell (1).

3. The electric lifting window curtain according to claim 1, wherein the first driven wheel (29) is rotatably connected with the first transmission shaft (24), the first driving wheel (27) is located at one side of the first driven wheel (29), and a first clapboard (210) is provided between the first driving wheel (27) and the first driven wheel (29) outside the first transmission shaft (24).

4. The electric lifting window curtain according to claim 1, wherein each of the second fixed cover plates (55) is fixed at one end of one of the second side covers cover (53) by screws, a second bearing (56) is provided outside each of the second transmission shafts (54) inside the second fixed cover plates plate (55), the second transmission shaft (54) is rotatably connected inside the second fixed cover plate (55) through the second bearing (56), the first end of the second transmission shaft (54) extends into the second side cover (53) is provided with a second shaft sleeve (58), a second shaft sleeve (58) is fixed in the second side cover (53), the second transmission shaft (54) is rotatably connected with the second shaft sleeve (58), and the second side cover (53) is detachably connected to a corner of the lower end of the cover shell (1).

5. The electric lifting curtain according to claim 1, wherein the second driven wheel (57) is rotatably connected with the second transmission shaft (54), the second driven wheel (57) is located at one side of the second driving wheel (59), and a second clapboard (510) is provided between the second driven wheel (57) and the second driving wheel (59) outside the second transmission shaft (54).

6. The electric lifting curtain according to claim 1, wherein the first driving wheel (27) drives the second driven wheel (57) to rotate through the first gear belt (10), and the second driving wheel (59) drives the first driven wheel (29) to rotate through the second gear belt (11).

7. The electric lifting curtain according to claim 1, wherein an inner surface of the first gear belt (10) is fixedly connected with a first toothed belt lock (12), ends of the first pull rod (4) are inserted into the first toothed belt lock (12), an inner surface of the second gear belt (11) is fixedly connected with a second toothed belt lock (13), ends of the second pull rod (7) are inserted into the second toothed belt lock (13), and the first pull rod (4) and the second pull rod (7) are slidably connected to an inner side of the cover shell (1) through the first gear belt (10) and the second gear belt (11) respectively.

8. The electric lifting curtain according to claim 1, wherein a lower end of the shade cloth (3) is wound around a surface of the first pull rod (4), the two rope winders (8) are fixed outside the two first output-shafts (22) respectively, an upper end of the anti-mosquito curtain (6) is wound around a surface of the second pull rod (7), and the shade cloth (3) is located in front of the anti-mosquito curtain (6).

* * * * *